Dec. 30, 1947.  W. COHEN  2,433,600
GAUGE PLATE ADJUSTING DEVICE FOR MEAT CUTTING MACHINES
Filed July 16, 1945
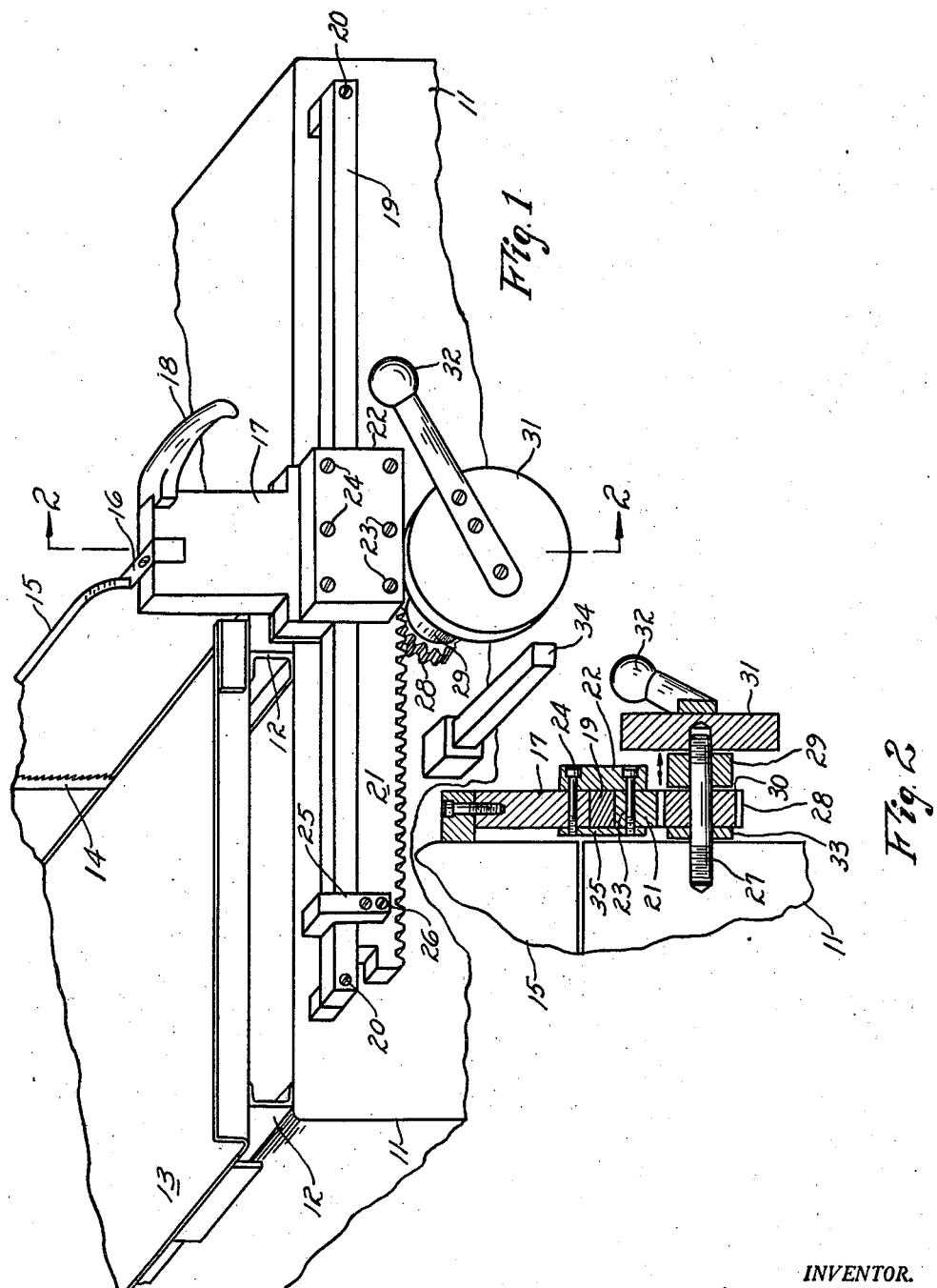
INVENTOR.
WILLIAM COHEN
BY
Robert A. Sloman
ATTORNEY.

Patented Dec. 30, 1947

2,433,600

UNITED STATES PATENT OFFICE 2,433,600

GAUGE PLATE ADJUSTING DEVICE FOR MEAT CUTTING MACHINES

William Cohen, Detroit, Mich.

Application July 16, 1945, Serial No. 605,322

5 Claims. (Cl. 146—102)

This invention relates to meat slicing or sawing machines, and more particularly to an adjustable slide mechanism therefor to regulate the thickness of the slice cut.

It is the object of the present invention to provide a slide support for the slice regulating plate of a meat cutting or sawing machine.

It is the object herein to provide manually operable means for locking the slice regulating plate in any desired adjusted position relative to the machine cutting means.

It is the further object herein to provide gear means associated with said slice regulating plate, together with manually operable friction means for locking said gear means in any relative adjusted position.

These and other objects will be seen from the following specification and claims in conjunction with the appended drawing, of which:

Fig. 1 is a fragmentary perspective view of a meat cutter embodying my invention, and Fig. 2 is an elevational section on line 2—2 of Fig. 1.

It will be understood that said figures illustrate merely a preferable embodiment of the invention and that other embodiments are contemplated within the scope of the claims hereinafter set out.

In the drawing, the meat slicing or cutting machine comprises a base 11, with a pair of transverse spaced guide rails 12, upon which is reciprocally mounted meat supporting table 13.

Said table is transversely reciprocal relative to the vertical saw 14 or rotating cutter blade, whose teeth or cutting edge lie in a plane parallel to the direction of movement of table 13.

Vertical slice regulating plate 15 longitudinally adjustable on base 11 at right angles to the direction of movement of reciprocal table 13 is adapted to define an adjustable spaced relation relative to saw 14 for regulating the thickness of the slice of meat to be cut. The meat supported on table 13 has one end thereof projected against plate 15 and is adapted for sliding movement relative thereto towards and away from saw 14.

Said regulating plate 15 has a supporting arm 16 secured within the top of slide 17 which is adapted to longitudinal reciprocal sliding movement relative to base 11 under manual application of handle 18.

Slide 17 is adapted to reciprocal sliding movement upon longitudinal slide support 19 which is secured at its ends by studs 20 to base 11.

Rack bar 21 reciprocally slidable relative to the under side of slide support 19, is retained in sliding engagement relatively thereto by supporting block 22 to which it is secured by studs 23. Said block is also secured by studs 24 to reciprocal slide 17, whereby longitudinal motion imparted thereto by handle 18 effects a corresponding longitudinal adjusting motion of rack bar 21.

Though not essential, it may be desirable to employ a secondary slide 25 adapted for sliding movement on support 19 with a depending portion thereof secured to rack bar 21 by studs 26.

As best illustrated in Fig. 2, stationary shaft 27 threaded into base 11 and extending therefrom, provides a journal for idler pinion 28 which is in mesh with the teeth of rack bar 21. Brake bushing 29 centrally and loosely carried on shaft 27 is adapted for longitudinal movements thereon relative to the sidewall 30 of pinion 28.

Brake disc 31 with handle 32 is centrally threaded on the outer end of shaft 27, and adapted for arcuate movement thereon. Clockwise rotation of said disc projects the same longitudinally on said shaft till it engages bushing 29 and projects the latter into frictional engagement with surface 30 of pinion 28.

Sufficient pressure on bushing 29 and pinion 28 projects said pinion into frictional braking engagement with washer 33 on said shaft interposed between said pinion and base 11, for effectively locking said pinion against rotation. Said pinion in mesh with rack gear 21 thus locks the latter and slice regulating plate 15 joined thereto in any desired longitudinally adjusted position. Handle 32 is likewise locked in the position shown in Fig. 1.

To release said pinion and plate 15, handle 32 is rotated counterclockwise to engage stop bar 34 which is secured to and extends outwardly from base 11 substantially parallel to handle 18 on slide 17.

Disc 31 is projected to the right relatively to its supporting shaft 27 releasing bushing 29 from frictional engagement with pinion 28. It will be undertood that with said bushing and disc in release position, slide 17 and slice regulating plate 15 are free for manual reciprocal sliding adjusting movement upon base 11 and slide support 19 secured thereto. To lock said plate in the desired adjusted position, handle 32 is merely rotated clockwise to the extreme position limited by the frictional contact between disc 31, bushing 29, gear 28 and washer 33.

Though not essential, it may be desirable to secure plate 35 on the opposite side of slide 17 and rack gear 21, with studs 23 and 24 extending into said plate. Said plate thus cooperates with block 22 in slidably supporting rack gear 21 relative to slide support 19.

Having described my invention, reference should now be had to the claims which follow for determining the scope thereof.

I claim:

1. In a meat cutting machine having a base and reciprocal meat supporting table thereon, a reciprocal slide adjustably mounted on said base for sliding movements transverse to the movement of said table, a slice regulating plate extending from and carried by said slide, gear means carried by said slide, rotatable gear means in mesh with said slide gear means, a non-rotatable shaft projecting from said base upon which said rotatable gear means is journaled, and manually rotatable means on said shaft adapted for translation towards and frictional engagement with said rotatable gear means for preventing rotative motion thereof.

2. In a meat cutting machine having a base and reciprocal meat supporting table thereon, a reciprocal slide adjustably mounted on said base for sliding movements transverse to the movement of said table, a slice regulating plate extending from and carried by said slide, gear means carried by said slide, rotatable gear means in mesh with said slide gear means, a non-rotatable shaft projecting from said base upon which said rotatable gear means is journaled, and manually rotatable means threaded on said shaft adapted for longitudinal axial movement thereon for frictional engagement with said rotatable gear means for preventing rotative motion thereof.

3. In a meat cutting machine having a base and reciprocal meat supporting table thereon, a reciprocal slide adjustably mounted on said base for sliding movements transverse to the movement of said table, a slice regulating plate extending from and carried by said slide, gear means carried by said slide, rotatable gear means in mesh with said slide gear means, a non-rotatable shaft projecting from said base upon which said rotatable gear means is journaled, and a manually rotatable disc threaded on said shaft adapted for longitudinal axial movement thereon for frictional engagement with said rotatable gear means for preventing rotative motion thereof.

4. In a meat cutting machine having a base and reciprocal meat supporting table thereon, a reciprocal slide adjustably mounted on said base for sliding movements transverse to the movement of said table, a slice regulating plate extending from and carried by said slide, gear means carried by said slide, rotatable gear means in mesh with said slide gear means, a non-rotatable shaft projecting from said base upon which said rotatable gear means is journaled, manually rotatable means threaded on said shaft adapted for longitudinal axial movement thereon, and friction means loosely carried on said shaft intermediate said rotatable gear means and said manually rotatable means.

5. In a meat cutting machine having a base and reciprocal meat supporting table thereon, a reciprocal slide adjustably mounted on said base for sliding movements transverse to the movement of said table, a slice regulating plate extending from and carried by said slide, a rack bar carried by said slide, a rotatable pinion in mesh with said rack bar, a non-rotatable shaft projecting from said base upon which said pinion is journaled, a manually rotatable disc threaded on said shaft adapted for longitudinal axial movement thereon, and a friction bushing loosely carried on said shaft intermediate said pinion and said disc.

WILLIAM COHEN.

REFERENCES CITED

The following references are of record in the file of this patent:

UNITED STATES PATENTS

| Number | Name | Date |
| --- | --- | --- |
| 1,455,699 | Adam et al. | May 15, 1923 |
| 2,169,517 | Biro | Aug. 15, 1939 |
| 2,341,256 | Wood | Feb. 8, 1944 |

FOREIGN PATENTS

| Number | Country | Date |
| --- | --- | --- |
| 365,486 | Great Britain | Jan. 21, 1932 |